United States Patent [19]
Apelian et al.

[11] Patent Number: 5,451,312
[45] Date of Patent: * Sep. 19, 1995

[54] CATALYST AND PROCESS FOR PRODUCING LOW-AROMATICS DISTILLATES

[75] Inventors: Minas R. Apelian, Vincentown; Thomas F. Degnan, Moorestown; Stuart S. Shih, Cherry Hill, all of N.J.

[73] Assignee: Mobil Oil Corporation, Fairfax, Va.

[*] Notice: The portion of the term of this patent subsequent to Nov. 23, 2010 has been disclaimed.

[21] Appl. No.: 143,407

[22] Filed: Oct. 26, 1993

[51] Int. Cl.$^6$ .................... C10G 45/12; C10G 45/52
[52] U.S. Cl. .................... 208/143; 585/266; 585/269; 585/273; 585/275
[58] Field of Search ............ 208/143; 585/269, 266, 585/275, 273

[56] References Cited
U.S. PATENT DOCUMENTS

| | | | |
|---|---|---|---|
| 5,102,643 | 4/1992 | Kresge et al. | 423/328 |
| 5,219,814 | 6/1993 | Kirker et al. | 502/66 |
| 5,227,353 | 7/1993 | Apelian et al. | 502/74 |
| 5,264,641 | 11/1993 | Borghard et al. | 585/269 |

Primary Examiner—Sharon A. Gibson
Assistant Examiner—Walter D. Griffin
Attorney, Agent, or Firm—Alexander J. McKillop; Dennis P. Santini; Robert B. Furr, Jr.

[57] ABSTRACT

This invention provides a process for producing a distillate boiling-range hydrocarbon product which comprises hydrotreating a hydrodesulfurized aromatic, substantially dealkylated hydrocarbon feed produced by the catalytic cracking of a hydrocarbon fraction, the feed having an initial boiling point of at least 300° F., an aromatic content of at least about 30 weight percent, a hydrogen content not more than about 12 weight percent and a sulfur content of not more than 5000 ppmw, in the presence of a catalyst comprising an inorganic, non-layered, porous, crystalline phase material having pores with diameters of at least about 13 Å and exhibiting, after calcination, an X-ray diffraction pattern with at least one peak with a relative intensity of 100 at a d-spacing greater than about 18 Å, said material containing at least one Group VIII metal and less than 5000 ppm Na, said process being carried out at a hydrogen partial pressure of not more than 1000 psig to evolve product containing less than about 10 weight percent aromatics and less than 300 ppmw sulfur at a 390° F.+ feed conversion of less than about 30 weight percent.

29 Claims, 2 Drawing Sheets

CATALYST AND PROCESS FOR PRODUCING LOW-AROMATICS DISTILLATES

Cross Reference to Related Applications

This application is related to allowed U.S. application Ser. No. 07/734,971, filed Jul. 12, 1991 (Mobil Case 6283) now U.S. Pat. No. 5,277,792, which relates to lube hydrocracking over catalysts comprising mesoporous crystalline materials. It is also related to Application Ser. No. 07/734,826 (Mobil Case No. 6274), filed Jul. 24, 1991 now U.S. Pat. No. 5,288,395, which is directed to the production of high quality lubestocks by two stage hydroprocessing using an ultra-large pore size catalyst.

This application is also related to application Ser. No. 07/734,990, filed Jul. 24, 1991, now abandoned, which relates to a process for reducing the unsaturation of lubricants using, as catalyst, an ultra-large pore crystalline material.

FIELD OF THE INVENTION

The invention relates to a catalyst and process for decreasing the aromatics content of a hydrodesulfurized petroleum distillate, particularly a hydrodesulfurized, catalytically cracked distillate boiling-range hydrocarbon stock. The catalyst for this process comprises a Group VIIIA metal, an M41S material, and preferably a binder.

BACKGROUND OF THE INVENTION

Under present conditions, petroleum refineries are finding it necessary to convert increasingly greater proportions of crude to premium fuels including gasoline and middle distillates such as diesel and jet fuel. Catalytic cracking processes, exemplified by the fluid catalytic cracking (FCC) process and Thermofor catalytic cracking (TCC) process together, account for a substantial fraction of heavy liquids conversion in modern refineries. Both are thermally severe processes which result in a rejection of carbon to coke and to residual fractions; during catalytic cracking high molecular weight liquids disproportionate into relatively hydrogen-rich light liquids and aromatic, hydrogen-deficient heavier distillates and residues.

Hydrocracking may be used to upgrade the higher-boiling more refractory products derived from catalytic cracking prior to the treatment in the present hydrotreating process. Useful hydrocracking catalysts include the catalysts taught in U.S. Pat. No. 5,227,353, the most prominent among which is a metallosilicate identified as MCM-41 which is usually synthesized with Brensted acid sites by incorporating a tetrahedrally coordinated trivalent element such as Al, Ga, B, or Fe within the silicate framework.

Catalytic cracking therefore produces significant quantities of highly aromatic, light and middle distillates which not only have high sulfur and nitrogen levels, but which may contain as much as 80 wt. % or more of aromatics. Generally, the level of heteroatom contaminants increases with the boiling point of the fraction. For example, the light cycle oil produced as a typical FCC main column bottoms stream contains about 80% aromatics, 4.6% sulfur compounds, 1500 ppm nitrogen compounds, and about 9.1% hydrogen (in proportions and percentages by weight, as in the remainder of this specification unless otherwise defined).

Present market requirements make highly aromatic product streams such as these particularly difficult to dispose of as commercially valuable products. Formerly, the light and heavy cycle oils could be upgraded and sold as light or heavy fuel oil, such as No. 2 fuel oil or No. 6 fuel oil. Upgrading the light cycle oil was conventionally carried out by a relatively low severity, low pressure catalytic hydrodesulfurization (CHD) unit in which the cycle stock would be admixed with virgin middle distillates from the same crude blend fed to the catalytic cracker.

At many petroleum refineries, the light cycle oil (LCO) from the FCC unit is a significant component of the feed to the catalytic hydrodesulfurization (CHD) unit which produces No. 2 fuel oil or diesel fuel. The remaining component is generally virgin kerosene taken directly from the crude distillation unit. The highly aromatic nature of LCO, particularly when the FCC unit is operated in the maximum gasoline mode, increases operational difficulties for the CHD and can result in a product having marginal properties for No. 2 fuel oil or diesel oil, as measured by cetane numbers and sulfur content. Further, increasingly stringent environmental regulations limiting the aromatics content of diesel fuel have prompted refiners to focus research efforts on economical methods for producing the required low-aromatics fuels.

An alternative market for middle distillate streams is automotive diesel fuel. However, diesel fuel has to meet a minimum cetane number specification of about 45 in order to operate properly in typical automotive diesel engines. Because cetane number correlates closely and inversely with aromatic content, the highly aromatic cycle oils from the cracker typically with aromatic contents of 80% or even higher have cetane numbers as low as 4 or 5. In order to raise the cetane number of these cycle stocks to a satisfactory level by the conventional CHD technology described above, substantial and uneconomic quantities of hydrogen and high pressure processing would be required.

Thus from an economic and operational standpoint, it would be desirable to rely upon the CHD unit for desulfurization, and to provide a more effective and less costly method for reducing aromatics content while providing a product which closely matches the boiling ranges of the feedstock.

SUMMARY OF THE INVENTION

The hydrotreating catalyst of the invention comprises a Group VIIIA metal on a mesoporous crystalline material having a substantially uniform hexagonal honeycomb microstructure with uniform pores having a cell diameter greater than 13 Å and typically in the range of 20 to 100 Å. The mesoporous crystalline material typically has a framework $SiO_2/Al_2O_3$ ratio of greater than about 20.0, and contains less than about 0.5 wt % Na. The catalyst composition preferably includes a binder or a matrix material. The term "Group VIIIA metal" as used herein refers to Fe, Co, Ni, Ru, Rh, Pd, Os, Ir, and Pt as shown in the Periodic Table of the Elements published as Catalog No. S-18806 by Sargent-Welch Scientific Company, 7300 North Linder Avenue, Skokie, Ill., 60077.

This invention provides a process for producing a distillate boiling-range hydrocarbon product which comprises hydrotreating an aromatic, substantially dealkylated hydrocarbon feed produced by the catalytic cracking of a hydrocarbon fraction, which feed has been catalytically hydrodesulfurized, the feed having an initial boiling point of at least about 300° F., an aromatic content of at least about 30 weight percent, a hydrogen content not more than about 10.0 weight percent and a sulfur content of not more than about 5000 ppmw, in the presence of a catalyst comprising an inorganic, non-layered, porous, crystalline phase material having pores with diameters of at least about 13 Å and exhibiting, after calcination, an X-ray diffraction pattern with at least one peak with a relative intensity of 100 at a d-spacing greater than about 18 Å to evolve product containing less than about 10 weight percent aromatics and less than 300 ppmw sulfur. The operating pressure usually falls within the range of from about 1000 to about 1200 psig.

The hydrotreating catalyst of this invention has an unusually low activity for boiling range conversion, thus producing a product having essentially the same boiling range as the feed. In one embodiment, the process of this invention is characterized by a 390° F.+ conversion of less than about 30 wt %, preferably less than about 20 wt %, and more preferably less than about 10 wt %. As used herein, the term "390° F.+ conversion" is defined as follows:

390° F.+ conversion =

$$\left\{ \frac{(390° \text{ F.+ in feed}) - (390° \text{ F.+ in product})}{390° \text{ F.+ in feed}} \right\}$$

In another embodiment, the process of this invention characterized by a 300° F.+ conversion of less than about 30 wt %, preferably less than about 20 wt %, and more preferably less than about 10 wt %. As used herein, the term "300° F.+ conversion" is defined as follows:

300° F.+ conversion =

$$\left\{ \frac{(300° \text{ F.+ in feed}) - (300° \text{ F.+ in product})}{300° \text{ F.+ in feed}} \right\}$$

The feed is preferably hydrotreated (hydrodesulfurized) upstream from the process of the present invention to reduce sulfur content in the feed to less than 5000 ppmw, preferably less than 1000 ppmw, more preferably less than 300 ppmw. In a particularly preferred embodiment, the feed is hydrodesulfurized to less than 50 ppmw sulfur.

The hydrotreating is operated under low to moderate pressure, typically 400-1200 psig (about 2860-8380 kPa) hydrogen pressure. At the relatively low severity conditions employed temperatures will generally be in the range 600°-850° F. (315°-455° C.), more preferably from about 550° to about 700° F. (from about 290° to about 455° C.) to maximize aromatics conversion.

DETAILED DESCRIPTION

Mesoporous Crystalline Component

Figure 1A:
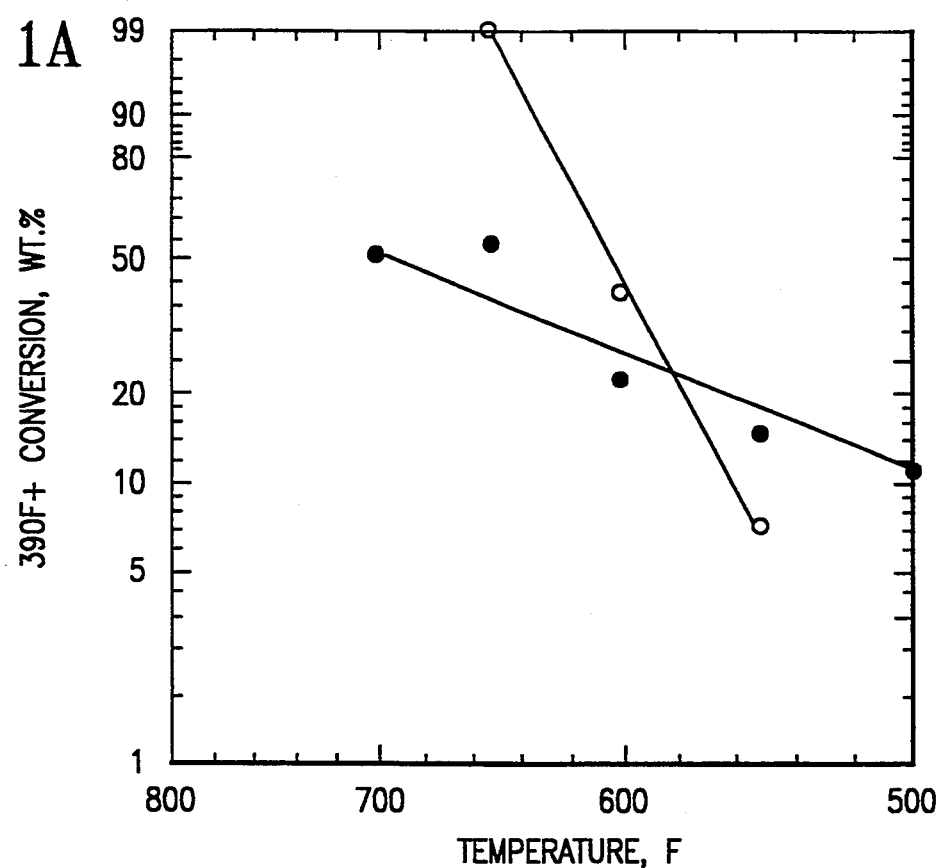
FIG. 1A is a plot of 390° F.+ feed conversion as a function of reaction temperature for a Pd/RE-USY/Al$_2$O$_3$ catalyst (datapoints represented by open circles) and a Pd/MCM-41/Al$_2$O$_3$ (datapoints represented by solid circles).

The mesoporous crystalline component of the catalyst is described in detail below. When it is used in the present catalysts, the mesoporus crystalline material is at least partly in the decationized or hydrogen form in order to provide the desired functionality for the reactions which are to take place.

The mesoporous catalytic material is an inorganic, porous, non-layered crystalline phase material which can be characterized (in its calcined form) by an X-ray diffraction pattern with at least one peak at a d-spacing breater than about 18 Å with a relative intensity of 100 and a benzene sorption capacity of greater than 15 grams of benzene per 100 grams of the material at 50 torr and 25° C. The X-ray pattern should be determined with the metal-free material since the presence of the metal component, particularly at high metal loadings, may obscure the X-ray pattern.

The preferred form of the crystalline material has a hexagonal arrangement of uniformly-sized pores with a maximum perpendicular cross-section pore dimension of at least about 13 Angstroms (Å), and typically within the range of from about 13 Å to about 200 Å. A preferred form of this hexagonal crystalline composition, identified as MCM-41, exhibits a hexagonal electron diffraction pattern that can be indexed with a d$_{100}$ value greater than about 18 Å, and a benzene adsorption capacity of greater than about 15 grams benzene/100 grams crystal at 50 torr and 25° C. This material is described in detail in Ser. No. 07/625,245, now U.S. Pat. No. 5,098,684, in U.S. Pat. No. 5,102,643 to Kresge et al., and below. The Kresge et al. patent is incorporated by reference as if set forth at length herein.

The inorganic, non-layered mesoporous crystalline material used as a component of the catalyst has the following composition:

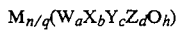

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1.

A preferred embodiment of the above crystalline material is when (a+b+c) is greater than d, and h=2. A further embodiment is when a and d=0, and h=2. The preferred materials for use in making the present hydrotreating catalysts are the aluminosilicates.

In the as-synthesized form, the catalytic material has a composition, on an anhydrous basis, expressed empirically as follows:

$$rRm_{n/q}(W_aX_bY_cZ_dO_h)$$

where R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods described below.

To the extent desired, the original M, e.g. sodium or chloride, ions of the as-synthesized material of this invention can be replaced in accordance with conventional ion-exchange techniques. Preferred replacing ions include metal ions, hydrogen ions, hydrogen precursor, e.g. ammonium, ions and mixtures of these ions. Particularly preferred ions are those which provide the desired metal functionality in the final hydrotreating catalyst. These include hydrogen, rare earth metals and metals of Groups VIIA (e.g. Mn), VIIIA (e.g. Ni), IB (e.g. Cu), IVB (e.g. Sn) of the Periodic Table of the Elements and mixtures of these ions.

The crystalline (i.e. having sufficient order to provide a diffraction pattern such as, for example, by X-ray, electron or neutron diffraction, following calcination with at least one peak) mesoporous material may be characterized by its structure, which includes extremely large pore windows as well as by its high sorption capacity. The term "mesoporous" is used here to indicate crystals having uniform pores within the range of from about 13 Å to about 200 Å. The mesoporous materials have uniform pores within the range of from about 13 Å to about 200 Å, more usually from about 15 Å to about 100 Å. Since these pores are significantly larger than those of other crystalline materials, it is appropriate to refer to them as ultra-large pore size materials. For the purposes of this application, a working definition of "porous" is a material that adsorbs at least 1 gram of a small molecule, such as Ar, $N_2$, n-hexane or cyclohexane, per 100 grams of the solid.

The catalytic material can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The preferred materials have a hexagonal arrangement of large open channels that can be synthesized with open internal diameters from about 13 Å to about 200 Å. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

The most regular preparations of the material of the present invention give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance $a_0$ between channels observed in the electron micrographs through the formula $d_{100}=a_0\sqrt{3/2}$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hk0 subset of unique reflections of 100, 110, 200, 210, etc., and their symmetry-related reflections.

In its calcined form, the crystalline material may be further characterized by an X-ray diffraction pattern with at least one peak at a position greater than about 18 Angstrom Units d-spacing (4.909° $2\theta$ for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal.

More particularly, the calcined crystalline non-layered material may be characterized by an X-ray diffraction pattern with at least two peaks at positions greater than about 10 Angstrom Units d-spacing (8.842°$\theta$ for Cu K-alpha radiation), at least one of which is at a position greater than about 18 Angstrom Units d-spacing, and no peaks at positions less than about 10 Å d-spacing with relative intensity greater than about 20% of the strongest peak. Still more particularly, the X-ray diffraction pattern of the calcined material of this invention will have no peaks at positions less than about 10 Å d-spacing with relative intensity greater than about 10% of the strongest peak. In any event, at least one peak in the X-ray diffraction pattern will have a d-spacing that corresponds to the $d_{100}$ value of the electron diffraction pattern of the material.

The calcined inorganic, non-layered crystalline material may also be characterized as having a pore size of about 13 Å or greater as measured by physisorption measurements, described below. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of $2\theta$, where $\theta$ is the Bragg angle, and a counting time of 10 seconds for each step. The interplanar spacings, d's, were calculated in Å (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). The diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as described below.

The ammonium form of the catalytic material may be readily converted to the hydrogen form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

Synthesis methods useful for preparing the mesoporous crystalline component of the invention is taught in U.S. Pat. Nos. 5,227,353 to Apelian et al., and 5,102,643 to Kresge et al., which are in corporated herein by reference for a description of this material.

Catalyst Metal Component

The catalyst of the invention comprises a mesoporous crystalline material as described below. The catalyst further comprises a Group VIIIA noble metal, and platinum and palladium are particularly preferred noble metal components.

The content of the metal component will vary according to its catalytic activity. Thus, the highly active noble metals may be used in smaller amounts than the less active base metals. For example, about 1 wt. percent or less platinum will be effective and in a preferred base metal combination, about 7 wt. percent nickel and about 2.1 to about 40 wt. percent tungsten, expressed as metal. The present support materials are, however, notable in that they are capable of including a greater proportion of metal than previous support materials because of their extraordinarily large surface area. The metal component may exceed about 25 percent and still maintain a high surface area above 200 $m^2$ $g^{-1}$. The metal component can be exchanged onto the support material, impregnated into it or physically admixed with it. If the metal is to be impregnated into or exchanged onto the mesoporous support, it may be done, for example, by treating the zeolite with a platinum metal-containing ion. Suitable platinum compounds include chloroplatinic acid, platinous chloride and various compounds containing the platinum ammine complex. The metal compounds may be either compounds in which the metal is present in the cation of the compound and compounds in which it is present in the anion of the compound. Both types of compounds can be used. Platinum compounds in which the metal is in the form of a cation of cationic complex, e.g., $Pt(NH_3)_4Cl_2$ are particularly useful, as are anionic complexes such as the vanadate and metatungstate ions. Cationic forms of other metals are also very useful since they may be exchanged onto the crystalline material or impregnated into it.

Mesoporous catalysts similar to those disclosed here are described also in the following co-pending applications: Application Ser. No. 07/734,971, filed Jul. 12, 1991, now U.S. Pat. No. 5,277,782 (Mobil Case No. 6283—discloses mesoporous lube hydrocracking catalysts); Ser. No. 07/734,826, filed Jul. 12, 1991, now U.S. Pat. No. 5,288,395 (Mobil Case No. 6274—discloses mesoporous catalysts used for wax hydrocracking/hydroisomerization).

Feedstocks

The feedstocks used in the present process are hydrocarbon fractions which are highly aromatic, which may also be hydrogen deficient, and which can contain up to about 0.5 wt % sulfur. These feedstocks generally comprise fractions which have been substantially dealkylated, as by a catalytic cracking operation, for example, in an FCC or TCC unit. Catalytic cracking characteristicly removes alkyl groups (generally bulky, relatively large alkyl groups, typically but not exclusively $C_5$–$C_9$ alkyls), which are attached to aromatic moieties in the feed. These detached alkyl groups form the bulk of the gasoline product from the cracker. The aromatic moieties such as benzene, naphthalene, benzothiophenes, dibenzothiophenes and polynuclear aromatics (PNAs) such as anthracene and phenanthrene form the high boiling products from the cracker. The mechanisms of acid-catalyzed cracking and similar reactions remove side chains of greater than 5 carbons while leaving behind short chain alkyl groups, primarily methyl, but also ethyl groups on the aromatic moieties. Thus, the "substantially dealkylated" cracking products include those aromatics with small alkyl groups, such as methyl, and ethyl, and the like still remaining as side chains, but with relatively few large alkyl groups, i.e., the $C_5$–$C_9$ groups, remaining. More than one of these short chain alkyl groups may be present, for example, one, two or more methyl groups.

Feedstocks of this type may have an aromatic content in excess of 50 wt. percent; for example, 70 wt. percent or 80 wt. percent or more, aromatics. Highly aromatic feeds of this type typically have hydrogen contents below 14 wt. percent, usually below 12.5 wt. percent or even lower, e.g. below 10 wt. percent or 9 wt. percent. The API gravity is also a measure of the aromaticity of the feed, usually being below 30 and in most cases below 25 or even lower, e.g. below 20. In most cases the API gravity will be in the range 5 to 25 with corresponding hydrogen contents from 8.5–12.5 wt. percent. Because the feeds useful in the process of this invention are desulfurized, the feeds typically contain less than 5000 ppmw sulfur, preferably less than about 1000 ppmw sulfur, more preferably less than about 300 ppmw sulfur. In a particularly preferred embodiment, the feed contains no more than about 50 ppmw sulfur. The nitrogen content of the feed typically ranges from about 50 to about 1000 ppmw, more usually from about 50 to about 650 ppmw.

Suitable feeds for the present process are substantially dealkylated cracking product fractions. Suitable feeds of this type include cycle oils from catalytic cracking units. Full range cycle oils may be used, for example, full range light. cycle oils with a boiling range of 385°–750° F., (about 195°–400° C.), e.g., 400°–700° F. (about 205°–370° C.) or, alternatively, cycle oil fractions may be employed such as heavy cycle oil or light cycle oil fractions. When operating with an extended boiling range feeds such as a full range light cycle oil (FRLCO), conversion should be limited so as to avoid excessive catalyst aging; a maximum conversion to a product containing about 5 wt % aromatics is preferred. However, if a light cut cycle oil is used, higher conversions may be tolerated. For this reason, lower boiling range fractions of that type are preferred. Thus, cycle oils with end points below 650° F. (345° C.), preferably below 600° F. (315° C.) are preferred. Initial boiling point will usually be 300° F. (150° C.) or higher, e.g. 330° F. (165°) or 385° F. (195° C.).

Feeds having higher endpoints tend to age the catalyst of the invention more rapidly. For this reason, less severe operating conditions (principally LHSV and temperature) are preferred for higher endpoint feeds. In a preferred embodiment, the maximum feedstock endpoint is about 750° F. (399° C.), more preferably about 700° F. (370° C.). Light cycle oils generally contain from about 60 to 80% aromatics and, as a result of the catalytic cracking process, are substantially dealkylated, as described above. Other examples of suitable feedstocks include the dealkylated liquid products from delayed or fluid bed coking processes. If a cycle oil fraction is to be used, it may be obtained by fractionation of a full range light cycle oil or by adjustment of the cut points on the catalytic cracker fractionation column.

While the aromatics content of the product stream varies with process severity, the product typically contains less than about 20 weight percent aromatics, preferably less than about 15 weight percent aromatics, and more preferably below about 10 weight percent aromatics.

This process decreases aromatics content without substantially changing the boiling range of the feedstock. In contrast, U.S. Pat. No. 5,219,814 to Kirker et al. teaches a process using an ultrastable zeolite Y catalyst which cracks the feedstock to lighter products. The '814 Kirker et al. patent is incorporated by reference as if set forth at length herein.

The invention will now be illustrated by the following Examples.

EXAMPLES

Example 1

A USY zeolite with a framework $SiO_2/Al_2O_3$ ratio of 200 (as measured by Al-NMR) and no detectable silanol content (as measured by Si-NMR) was exchanged with a rare earth chloride solution at pH=5. 65 parts by weight of this RE-exchanged USY was mixed with 35 parts by weight $Al_2O_3$ on a dry basis. Enough water was added to form an extrudable paste. This mixture was formed into 1/16" extrudates. The extrudates were dried at 250° F. and air calcined at 1000° F. for 3 hours. The calcined extrudates were humidified and then exchanged with a solution containing $Pd(NH_3)_4^{++}$. The Pd-containing extrudates were then calcined at 550° F. This material is referred to as Catalyst A and has properties summarized in Table 1.

Example 2

An MCM-41S catalyst was prepared in accordance with the procedure of U.S. Pat. No. 5,102,643 to Kresge et al.

Example 3

65 parts by weight of the MCM-41S material prepared in Example 2 (which contained a high concentration of silanol groups) was ammonium exchanged, dried, and then mixed with 35 parts by weight $Al_2O_3$ on a dry basis. Enough water was added to form an extrudable paste. This mixture was formed into 1/16" extrudates. The extrudates were dried at 250° F., heated to 900° F. in $N_2$, held in $N_2$ for 6 hours, and air calcined at 1000° F. for 9 hours. The calcined extrudates were humidified and then exchanged with a solution containing $Pd(NH_3)_4^{++}$. The Pd-containing extrudates were then calcined at 550° F. This material is referred to as Catalyst B and has properties summarized in Table 1.

Example 4

Figure 1B:
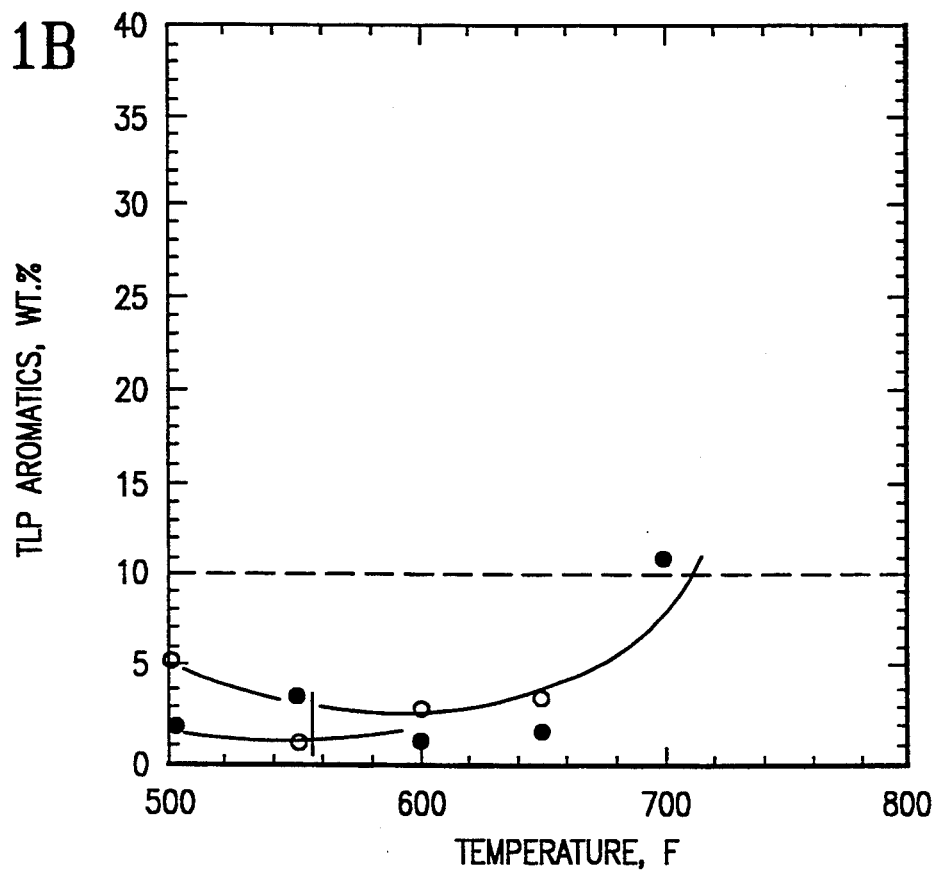
FIG. 1B is a plot of product aromatics content as a function of reaction temperature for a Pd/RE-USY/Al$_2$O$_3$ catalyst (datapoints represented by open circles) and Pd/MCM-41/Al$_2$O$_3$ (datapoints represented by solid circles).
Figure 2A:
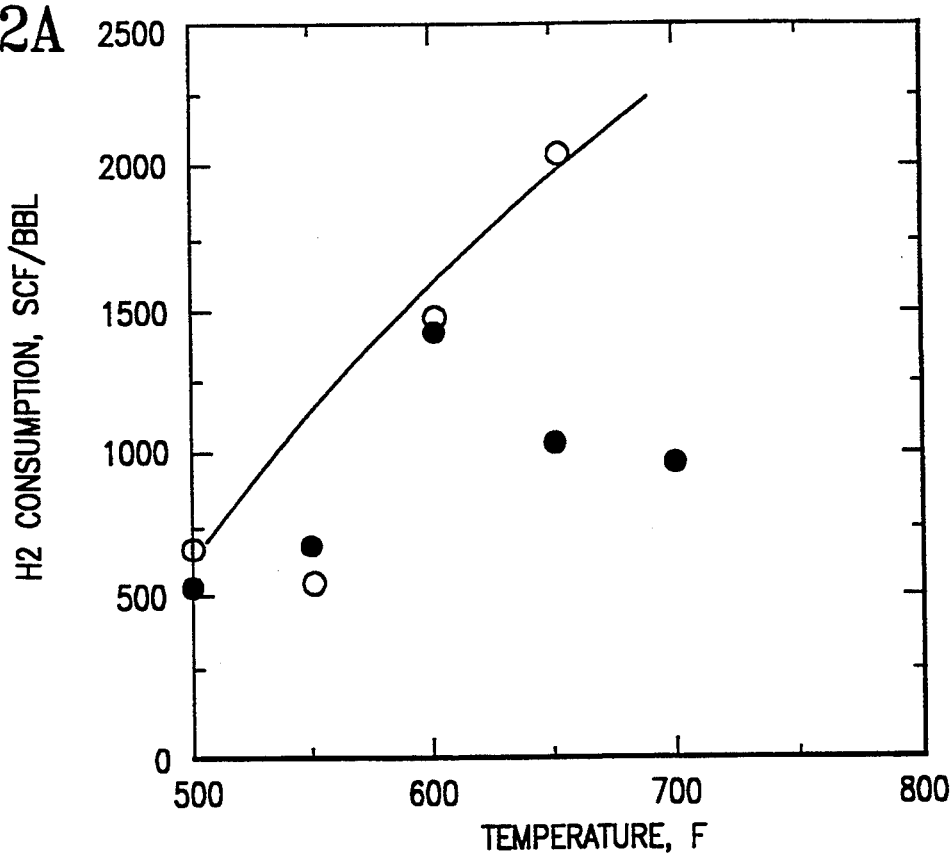
FIG. 2A is a plot of hydrogen consumption in standard cubic feet per barrel of hydrocarbon feed as a function of reaction temperature for a Pd/RE-USY/Al$_2$O$_3$ catalyst (datapoints represented by open circles) and Pd/MCM-41/Al$_2$O$_3$ (datapoints represented by solid circles).
Figure 2B:
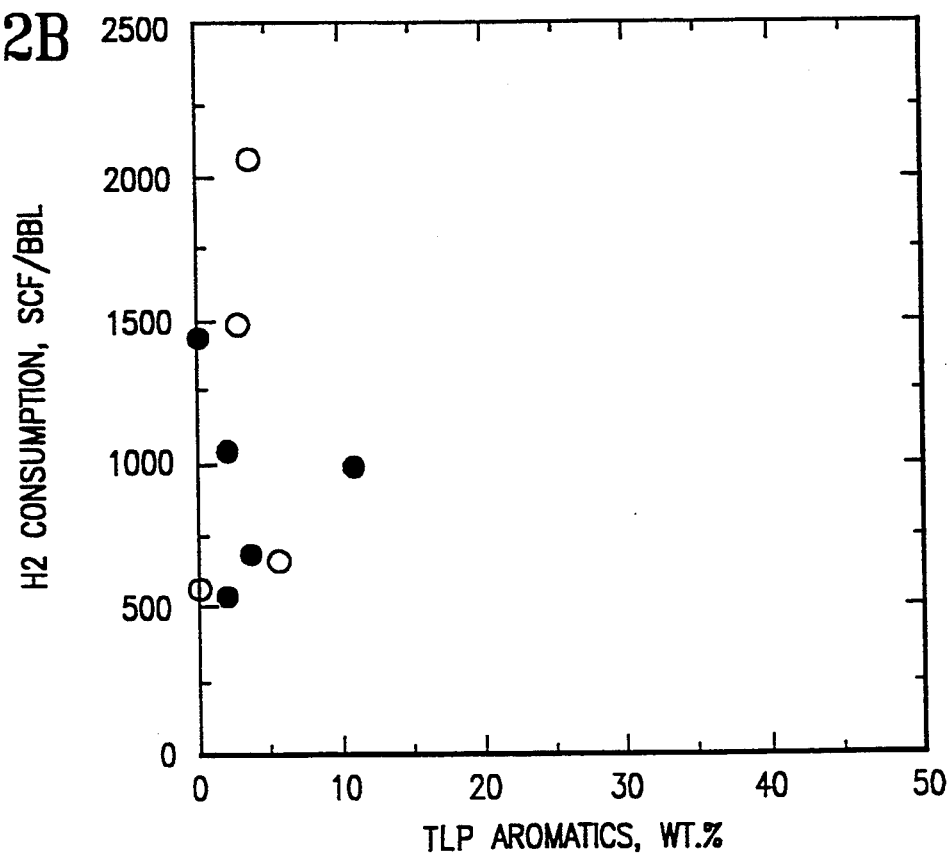
FIG. 2B is a plot of hydrogen consumption in standard cubic feet per barrel of hydrocarbon feed as a function of total aromatics in the product for a Pd/RE-USY/Al$_2$O$_3$ catalyst (datapoints represented by open circles) and Pd/MCM-41/Al$_2$O$_3$ (datapoints represented by solid circles).

The catalysts described above in Examples 1 and 2 were used to treat a low-sulfur (<10 ppmw) distillate fuel containing 45 wt % aromatics (Feed-I, Table 2). Example 3 demonstrates catalyst performance for hydrogenation of low-sulfur fuels derived from a conventional high-pressure (>1000 psig) hydrotreating process. Each catalyst was crushed and sized to 14/24 mesh, and evaluated at 1 LHSV and 1000 psig $H_2$ pressure. Each catalyst was reduced in 350 psig $H_2$ at 350° F. for three hours prior to introducing the feed. The results for the three catalysts are summarized in Table 3 and FIGS. 1A through 2B. While both catalysts reduce aromatics content to below 5 wt %, Catalyst B gives a higher yield of low-aromatics distillate while consuming less hydrogen. Further, Catalyst B exhibits a lower activation energy for conversion to products having atmospheric boiling points at or below 390° F.

Example 5

Catalyst A and Catalyst B were evaluated using a feedstock produced from a conventional catalytic hydrodesulfurizer (625 psig, Co-Mo or Ni-Mo hydrodesulfurization catalyst). The feedstock (Feed-II, Table 2) produced from the CHD unit contained 500 ppmw sulfur, 41.3 wt % aromatics, and 200 ppmw nitrogen. Results are shown in Table 4. Catalyst A was effective in reducing aromatics content with only a minor loss in yield. Catalyst B, on the other hand, appears to be most applicable for feeds containing less than about 0.05 wt % sulfur.

TABLE 1

Catalyst Properties

|  | Catalyst A | Catalyst B |
| --- | --- | --- |
| Crystalline Catalytic Material | USY | MCM-41 |
| Framework $SiO_2/Al_2O_3$ | 200 | 40 |
| Crystalline Catalytic Material, wt. % | 65 | 65 |
| Binder | $Al_2O_3$ | $Al_2O_3$ |
| Binder wt. % | 35 | 35 |
| $RE_2O_3$, wt. % | 0.09 | — |
| Palladium, wt. % | 0.63 | 0.83 |
| Sodium, ppmw | 320 | 78 |
| $C_5$—$C_6$ Sorption, wt. % | 16.9 | — |
| Pore Volume, g/cc | 0.67 | 0.97 |
| Particle Density, g/cc | 0.95 | 0.73 |
| Surface area, $m^2/g$ | 451 | 682 |
| Chemisorption |  |  |
| H/Pd ratio | 0.74 | 1.06 |
| O/Pd ratio | 0.54 | 0.52 |

TABLE 2

Feedstocks Properties

|  | Feed-I | Feed-II |
| --- | --- | --- |
| Gravity, API | 31.8 | 32.1 |
| Sulfur, ppmw | <10 | 500 |
| Nitrogen, ppmw | 2 | 200 |
| Aromatics (ASTM-M1539) | 45 | 41.3 |
| Distillation (ASTM-D2887) |  |  |
| Weight Percent | Temperature, °F. |  |
| 5 | 341 | 363 |
| 30 | 488 | 458 |
| 50 | 541 | 513 |
| 70 | 592 | 569 |
| 95 | 697 | 672 |

TABLE 3

Summary of Example 3
Yield and Conversion based on 390° F. cut point
Catalyst A: Pd/(200/1) USY/$Al_2O_3$
Catalyst B: Pd/MCM-41/$Al_2O_3$

|  | Feed-I | Product from reaction with Catalyst A | Product from reaction with Catalyst B |
| --- | --- | --- | --- |
| LHSV | — | 1.0 | 1.0 |
| Pressure, psig | — | 1000 | 100 |
| LHSV, $hr^{-1}$ | — | 1.0 | 1.0 |
| Temperature, °F. | — | 600 | 600 |
| Conversion, wt. % | — | 44.4 | 21.7 |
| Yield, wt. % | 97.7 | 54.3 | 76.6 |
| $H_2$ Consumption, SCF/B (Standard Cubic Feet per Barrel of Feed) | — | 1491 | 1432 |
| Sulfur, ppmw | <12 | <10 | <10 |
| Aromatics, wt. % | 45 | 2.7 | <1.0 |

TABLE 4

Summary of Example 4
Yield and Conversion based on 390° F. cut point

|  | Feed | Product from reaction with Catalyst A | Product from reaction with Catalyst B |
| --- | --- | --- | --- |
| LHSV | — | 1.0 | 1.0 |
| Pressure, psig | — | 1000 | 1000 |
| LHSV, $hr^{-1}$ | — | 1.0 | 1.0 |
| Temperature, °F. | — | 650 | 650 |
| Conversion, wt. % | — | 15.5 | 1.1 |
| Yield, wt. % | 91.0 | 76.9 | 90.0 |
| $H_2$ Consumption, SCF/B (Standard Cubic Feet per Barrel of Feed) | — | 1853 | 584 |
| Sulfur, ppmw | 500 | <10 | 260 |
| Desulfurization, % | — | 96 | 48 |
| Aromatics, wt. % | 41.3 | 8.3 | 40.6 |

Changes and modifications in the specifically described embodiments can be carried out without departing from the scope of the invention which is intended to be limited only by the scope of the appended claims.

We claim:

1. A process for producing a distillate boiling-range hydrocarbon product which comprises hydrotreating a hydrodesulfurized aromatic, substantially dealkylated hydrocarbon feed produced by the catalytic cracking of a hydrocarbon fraction, the feed having an initial boiling point of at least 300° F., an aromatic content of at least about 30 weight percent, a hydrogen content not more than about 12 weight percent and a sulfur content of not more than 5000 ppmw, in the presence of a catalyst comprising an inorganic, non-layered, porous, crystalline phase material having pores with diameters of at least about 13 Å and exhibiting, after calcination, an X-ray diffraction pattern with at least one peak with a relative intensity of 100 at a d-spacing greater than about 18 Å, said material containing at least one Group VIIIA metal and less than 5000 ppm Na to evolve product containing less than about 10 weight percent aromatics and less than 300 ppmw sulfur at a 390° F.+ feed conversion of less than about 30 weight percent.

2. A process according to claim 1 in which the crystalline phase material has, after calcination, a hexagonal arrangement of uniformly-sized pores with diameters of at least about 13 Å and exhibits a hexagonal electron diffraction pattern that can be indexed with a $d_{100}$ value greater than about 18 Å.

3. The process of claim 1 in which the crystalline phase exhibits a benzene adsorption capacity of greater than about 15 grams benzene per 100 grams at 50 torr and 25° C.

4. The process of claim 1 in which the crystalline phase has a composition expressed as follows:

$$M_{n/q}(W_a X_b Y_c Z_d O_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

5. The process of claim 4 wherein W comprises a divalent first row transition metal or magnesium; X comprises aluminum, boron, gallium or iron; Y comprises silicon or germanium; and Z comprises phosphorus.

6. The process of claim 4 wherein a and d are 0 and h=2.

7. The process of claim 6 wherein X comprises aluminum, boron, gallium or iron and Y comprises silicon or germanium.

8. The process of claim 7 wherein X comprises aluminum and Y comprises silicon.

9. The process of claim 1 in which the catalyst comprises at least one metal of Groups VIA, VIIA or VIIIA of the Periodic Table.

10. The process of claim 1 in which the catalyst comprises at least one metal of Group VIA and at least one metal of Group VIIIA of the Periodic Table.

11. The process of claim 1 in which the feed is contacted with the catalyst at a pressure of from 400 to 1200 psig, and a temperature from 500° to 850° F.

12. The process of claim 11 in which the feed is contacted with the catalyst at a temperature from 550° to 750° F.

13. The process of claim 4, in which the distillate boiling-range hydrocarbon product comprises a fraction boiling above 385° F.

14. The process of claim 4, in which the feed comprises a hydrodesulfurized catalytic cracking cycle oil.

15. The process of claim 4, in which the feed has a hydrogen content of 8.5 to 12 weight percent.

16. The process of claim 4, in which the feed has an API gravity not more than 25.

17. The process of claim 4, in which the feed has an API gravity not more than 20.

18. The process of claim 4, in which the feed has an API gravity of 5 to 25.

19. The process of claim 1 in which the 390° F.+ feed conversion is less than about 20 weight percent.

20. The process of claim 19 in which the 390° F.+ feed conversion is less than about 15 weight percent.

21. The process of claim 20 in which the 390° F.+ feed conversion is less than about 10 weight percent.

22. The process of claim 21 in which the conversion of feed having an initial boiling point of at least 300° F. is less than about 20 weight percent.

23. The process of claim 22 in which the conversion of feed having an initial boiling point of at least 300° F. is less than about 15 weight percent.

24. The process of claim 23 in which the conversion of feed having an initial boiling point of at least 300° F. is less than about 10 weight percent.

25. The process of claim 1 wherein the endpoint of said hydrodesulfurized feedstock is less than about 750° F.

26. The process of claim 25 wherein the endpoint of said hydrodesulfurized feedstock is less than about 700° F.

27. The process of claim 1 wherein said catalyst comprises at least about 0.1 wt % of said Group VIIIA metal.

28. The process of claim 27 wherein said catalyst comprises at least about 0.3 wt % of said Group VIIIA metal.

29. The process of claim 1 wherein said Group VIIIA metal is selected from the group consisting of platinum and palladium.

* * * * *